United States Patent Office 2,722,766
Patented Nov. 8, 1955

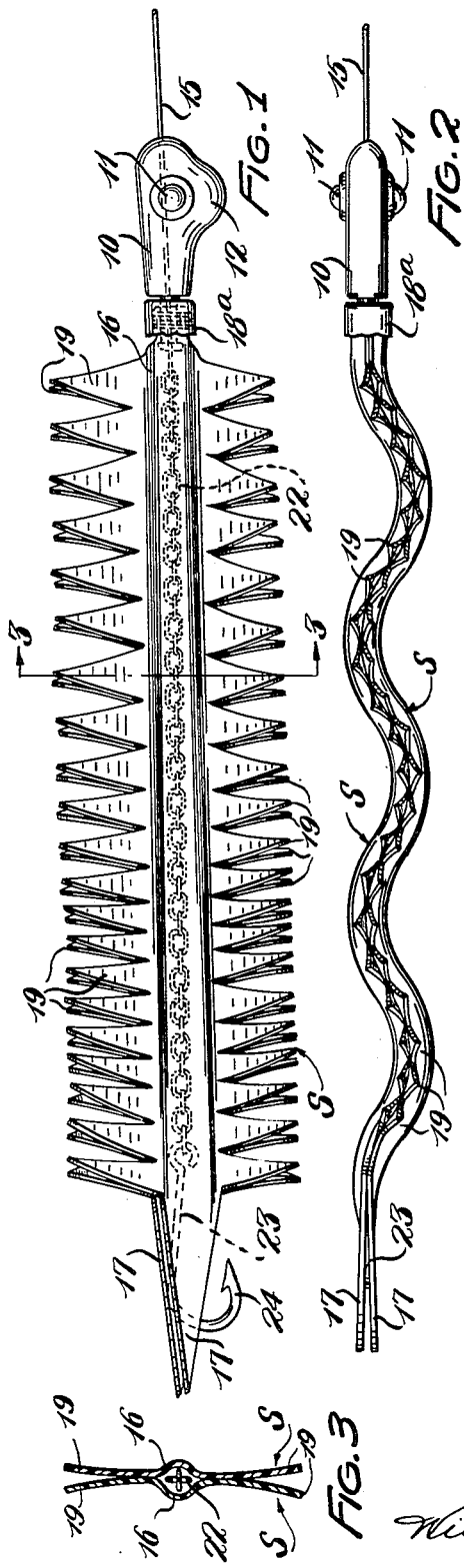

2,722,766

FISH LURE

Anthony C. Accetta, East Cleveland, Ohio

Application December 11, 1952, Serial No. 325,269

2 Claims. (Cl. 43—42.24)

This invention relates to a fish lure and more particularly to a fish lure especially adapted for trolling or casting.

An object of the invention is to provide an improved and novel fish lure which when it is drawn through the water by a fishing line closely simulates marine life that is attractive to fish as, for instance, it realistically appears as a sea worm moving through the water.

Another object is to provide an improved and novel fish lure such as referred to in the previous object and in which the body is completely flexible, is of simple durable construction and can be readily and economically produced.

Further and additional objects and advantages not hereinbefore referred to will become apparent hereinafter during the detailed description of several embodiments of the invention which is to follow. Said embodiments of the invention are illustrated in the accompanying drawing which forms part of this specification and is to be considered in conjunction therewith and wherein, Fig. 1 is an elevational view of one form of fish lure embodying the invention.

Fig. 2 is a view of the fish lure shown in Fig. 1 taken looking from the top of Fig. 1 and with the lure being illustrated in sinuous form representing the wavy motion the lure will have when drawn through water.

Fig. 3 is a sectional view taken substantially on line 3—3 of Fig. 1 looking in the direction of the arrows.

Fig. 4 is an enlarged central longitudinal sectional view through the head of the lure and a portion of the body and illustrates the manner in which the body is secured to the head.

The lure shown comprises a head 10 which preferably is formed of lead or other heavy material, cast or molded or otherwise produced. The head 10 functions as a sinker and also provides the necessary mass or weight to allow the lure to be used in casting. The head 10 is provided with portions 11 representing eyes and on the underside with a keel-like portion 12 which functions to maintain the head properly positioned in the water.

The head 10 diminishingly tapers from its large outer end toward its inner end and at its inner or smaller end is provided with a reduced neck portion 13 terminating in an annular flange 14 for a purpose later to become apparent. A wire 15 extends through the head 10 and beyond the large end of the head and said wire 15 can be attached to the fishing line as will be well understood in the art. The wire 15 extends beyond the flange 14 of the head and into the body of the lure as will shortly be explained.

The body of the fish lure is formed of two identical strips S of suitable freely flexible material, such as nylon, latex, silk or any other suitable synthetic plastic or natural material that is freely flexible and of light weight. Preferably the body of the lure will be formed of brightly colored material.

Each of the strips S forming the body of the lure comprises a central longitudinally extending portion 16 of substantially uniform width from the head end of the body to the tail end thereof. At the tail end of the body each strip has a rearwardly and a diminishingly tapered tail portion 17 that is in longitudinal extension of the portion 16. The two strips constituting the body are placed against each other in registration and then the central portions 16 of the two strips are integrated or secured together along their longitudinal edges, wherefore the body has a central longitudinally extending tube or envelope portion for a purpose later to be pointed out but with said portion terminating at the junction of the body and tail so that the tail portions 17 of the strips are not connected together. If the strips are formed of plastic or latex material they may be secured together by fused seams produced by heat and pressure. If they are formed of silk or similar material they may be secured together by stitching seams.

The strips constituting the body adjacent the head 10 are provided with a neck portion 18 the purpose of which will later be pointed out. Each strip of the body outwardly of the longitudinal edges of the central portion 16 thereof is provided with a plurality of outwardly extending fingers or feelers 19 which may take any desired shape but which are shown as of outwardly diminishing tapered configuration.

The series of fingers or feelers 19 extend longitudinally of the body from both sides thereof and it will be understood that said feelers 19 of the one strip preferably are not connected to the feelers 19 of the other strip, wherefore the feelers are free to wave independently of each other like tentacles and thus to more realistically cause the lure to simulate a sea worm or other marine animal as it moves through the water.

The neck portion 18 of the body is positioned around the reduced portion 13 of the head 10 as indicated in Fig. 4 and then is secured to the head 10 by wrapping around the neck portion 18 outside of the reduced portion 13 of the head nylon or other suitable thread 20 as will be well understood, wherefore the neck portion 18 is securely connected to the head 10 between the flange 14 and the shoulder at the outer end of the reduced portion 13 of the head. When this has been done the extreme outer end of the neck portion 18 of the body indicated in the drawings at 18a is turned back over the threads 20 as clearly indicated in Figs. 1 and 2.

As already stated, the wire 15 extends beyond the flange 14 of the head and into the body of the lure, in fact into the longitudinal center tube or envelope formed by the central portions 16 of the strips of material constituting the body.

The inner end of the wire 15, as indicated at 21 in Fig. 4, is looped around the end link of a freely flexible chain 22. The chain 22 extends substantially the longitudinal length of the body through the central tube or envelope formed by the portions 16 of the body. The link of the chain 22 adjacent to the tail of the body is connected to a suitable fish hook 23 that extends from the tube or envelope to between the tail portions 17, with the barb 24 of the hook located below the tail portions 17.

From the foregoing description of the form of lure embodying the invention, it will readily be seen that an efficient and effective lure results from this construction and that such lure is freely flexible so that as it is drawn through the water the body will have the sinuous configuration shown in Fig. 2, while the feelers 19 will wave or have tentacular movement. Also it will be appreciated that the head 10 provides sufficient weight to enable the lure to be cast by the fisherman and, in addition, will function as a sinker to maintain the lure submerged as it is drawn or moved through the water.

The lure can be economically produced and will be durable in use, inasmuch as there are extremely durable, freely flexible materials of which the body can be formed.

Although a form of lure embodying the invention has been illustrated and described herein it will be understood that the invention is susceptible of variations coming within the scope of the appended claims.

Having thus described my invention, I claim:

1. A fish lure comprising a head, a freely flexible elongated body secured to said head, said body including freely flexible thin identical flat strips each having a central longitudinal portion from the opposite longitudinal edges of which project a longitudinal series of freely flexible or waving fingers or feelers, one of said strips being superimposed on the other of said strips in registry therewith with the central portion and feelers of one strip overlying the central portion and feelers of the other strip, said strips being secured together adjacent the longitudinal edges of the central portion of said strips to form a longitudinally extending envelope or tube in said body, said strips outwardly of the longitudinal edges of their central portions being separate from each other and having on the opposite longitudinal edges of each strip a series of feelers in registration with the corresponding feelers on the other strip and such registering feelers being free to flex or move individually toward or away from each other, and a freely flexible element extending longitudinally of the body through said tube or envelope and adapted to have one end operatively connected to said head and its other end connected to a fish hook.

2. A fish lure as defined in claim 1 and wherein the strips constituting the body are provided at their ends remote from said head with outwardly diminishing tapered tail portions in continuation of the central portions of said strip and between which tail portions the fish hook is located, said tail portions being separate from each other and free to flex or move independently toward or away from each other.

References Cited in the file of this patent

UNITED STATES PATENTS

| | | |
|---|---|---|
| 1,267,627 | Campbell | May 28, 1918 |
| 1,750,783 | Pemberton | Mar. 18, 1930 |
| 1,792,366 | Ettles | Feb. 10, 1931 |
| 1,885,917 | Kelemen et al. | Nov. 1, 1932 |
| 2,261,549 | Hayes | Nov. 4, 1941 |
| 2,290,433 | Jeffers | July 21, 1942 |
| 2,611,206 | Harvey | Sept. 23, 1952 |

FOREIGN PATENTS

| | | |
|---|---|---|
| 168,427 | Great Britain | Sept. 5, 1921 |